United States Patent [19]

Pouska et al.

[11] 3,983,895

[45] Oct. 5, 1976

[54] PUMP STATION BYPASS SYSTEM

[75] Inventors: George A. Pouska; Charles M. Harris, both of Littleton, Colo.

[73] Assignee: Marathon Oil Company, Findlay, Ohio

[22] Filed: Apr. 17, 1975

[21] Appl. No.: 569,047

[52] U.S. Cl. .......................... 137/268; 15/104.06 A

[51] Int. Cl.[2] .......................................... B08B 9/04

[58] Field of Search........................ 137/268, 1, 565; 302/14; 15/104.06 A, 3.5; 134/8

[56] References Cited

UNITED STATES PATENTS

| | | | |
|---|---|---|---|
| 3,325,222 | 6/1967 | Round et al. | 302/14 |
| 3,428,489 | 2/1969 | Gentry, Jr. | 137/268 X |
| 3,620,236 | 11/1971 | Van Arsdale et al. | 137/268 X |
| 3,664,356 | 5/1972 | Grove et al. | 137/268 X |
| 3,678,950 | 7/1972 | Ragsdale | 137/565 X |
| 3,682,186 | 8/1972 | Howe | 137/1 |
| 3,722,530 | 3/1973 | Van Arsdale et al. | 137/268 |
| 3,746,027 | 7/1973 | Elliott | 137/1 |

*Primary Examiner*—Martin P. Schwadron
*Assistant Examiner*—Robert J. Miller
*Attorney, Agent, or Firm*—Joseph C. Herring; Jack L. Hummel

[57] ABSTRACT

Pipeline capsules, pigs, or other solid objects bypass a pipeline pump station via a bypass system that avoids cycling of the primary fluid flow. The fluid is removed from the main pipeline through perforations in the pipeline wall, transported through the pump and reinjected into the main pipeline downstream from the fluid removal point. Two valves are located in the main pipeline between the fluid removal point and the fluid reinjection point. The first valve is opened in response to the detection of the incoming solid object, allowing it to pass through the valve. The first valve is then closed and the second valve opened to allow the solid object to pass through the second valve and reenter the main fluid stream.

5 Claims, 1 Drawing Figure

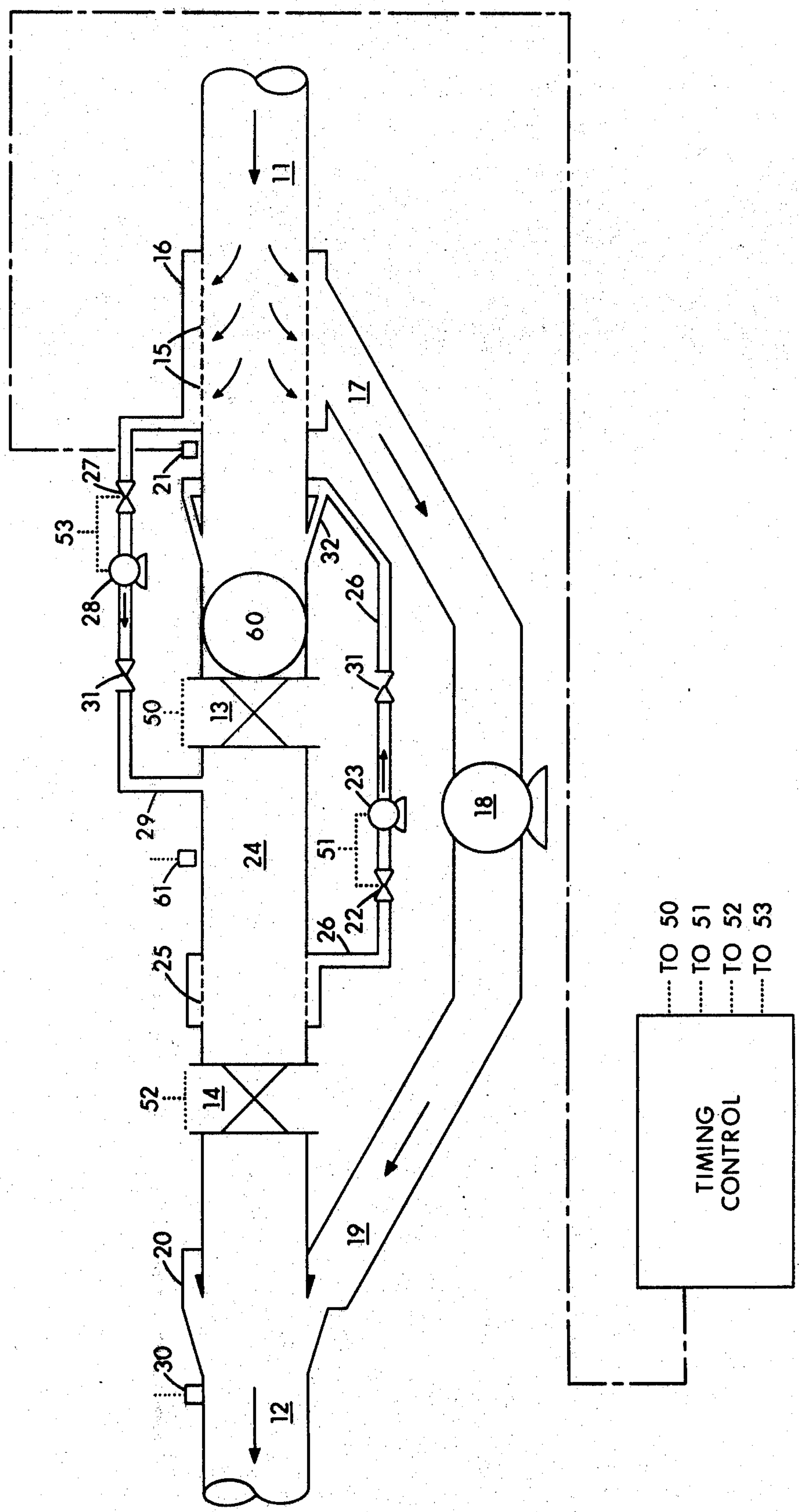
TIMING CONTROL
TO 50
TO 51
TO 52
TO 53

PUMP STATION BYPASS SYSTEM

BACKGROUND OF THE INVENTION

1. Field of the Invention

This invention relates to a system for passing solid objects by a pipeline pumping station.

2. Prior Art

In the long distance pipeline transportation of liquids and gases, it is a common practice to insert solid objects into the pipeline. The solid objects may be the primary products being transprted in the pipeline, in which case they are generally called "capsules". Capsules may consist entirely of a solid product, or may consist of a solid, gel or liquid product that is encapsulated in a solid or flexible membrane. The solid objects may also be used to separate batches of fluid, in which case they are generally called "spacers" or "displacers". Or, the solid objects may be equipped with brushes or scrapers to clean the internal pipeline wall, in which case they are generally called "scrapers". Such objects are usually spherical or cylindrical in shape, having an external diameter slightly less than the internal diameter of the pipeline and are usually made of a hard or resilient material. All of these objects may fall under the classification of pipeline capsules or pigs.

Pipelines that cover long distances generally have booster pumping stations to maintain desired flow rates. When pipeline capsules, pigs or other solid objects are present in the flowing fluid, it is either necessary to provide a way to remove them from the fluid upstream from the pumping station and then reinject them at a point downstream from the station, or to provide a way for passing the solid objects by the station without removing them from the main pipeline. The latter may be accomplished by shutting the pump station down and opening a valve located in the main pipeline between the station suction and discharge lines to allow the flowing fluid to carry the solid object past the pump station. This method can be economically unattractive, particularly when there are several solid objects in the fluid stream, since pressure surges are created when the pumping system is shut-down and then subsequently restarted. This method also results in the mixing of fluids immediately preceding the solid object in the pipeline with fluids immediately following the solid object, as the fluids preceding the solid object are retained in the pump station piping when the station is shut down.

Several systems defined in the patent literature teach passing solid objects by a pumping station:

U.S. Pat. No. 3,212,116 to Gentry, Jr. teaches a pipeline scraper passing system which senses the arrival of a scraper upstream from a pumping station and switches the inlet and outlet for the station to a point upstream from the scraper. After passage of the scraper, the system is returned to normal operation.

U.S. Pat. No. 3,664,356 to Grove et al. teaches a system for removing separator spheres from a pipeline and then reinjecting them into the line at a point downstream from a pumping station. Timing devices are employed to provide for injection of the spheres at the interface region between different products in the pipeline.

U.S. Pat. No. 3,678,950 to Ragsdale teaches a system for passing a batch of slurry around a pumping station by sensing the slurry approaching the upstream side of the station inlet and switching the station inlet and outlet to a point upstream from the slurry batch.

U.S. Pat. No. 3,682,186 to Howe teaches a system for passing a scraper by a pump station which uses a pig sensing device and timing controller to redirect pump inlet and discharge flow. Pumping is returned through the normal flow channels after the scraper has passed the station.

None of the prior art pump station bypassing systems provide for the continuous unidirectional flow of the primary fluid while passing a solid object past the pump station.

SUMMARY OF THE INVENTION

A pipeline pump bypass system, having two valves in the main pipeline located between the intersections of the main pipeline and the pump station suction and discharge piping, is capable of passing solid objects by the pump station without cycling of the fluid flow or interrupting continuous pumping of the fluid through the pump station. This pipeline pump bypass system eliminates pressure surges in the pipeline normally associated with passing solid objects by a pump station and together with the continuous direct flow of the pipeline fluid provides a highly efficient pumping system.

BRIEF DESCRIPTION OF THE DRAWING

FIG. 1 is a schematic drawing of the pump bypass system of the present invention.

DESCRIPTION OF THE PREFERRED EMBODIMENTS

The pump bypass system of the present invention as illustrated in FIG. 1 includes upstream 11 and downstream 12 sections of a main pipeline. Main line valves 13 and 14 are normally in the closed position. As fluid being transported in the pipeline approaches the pumping station, it is forced out of the upstream section of the main pipeline through perforations 15 in the pipeline wall and into jacket 16 and the pump station suction piping 17. The fluid is pumped by pumping means 18 into pump discharge piping 19 and then is reinjected into the downstream section 12 of the main pipeline through injection means 20. The direction of this fluid flow is indicated by arrows.

A solid object 60 approaching the pumping station is propelled past the perforated segment 15 of the pipeline by the pressure differential between the upstream and downstream sides of the pig. Upon arrival of the solid object, main line valve 13 is opened to allow the solid object to move into the midsection 24 of the pipeline. In this embodiment, the movement of the solid object into the midsection of the pipeline is assisted by means of a first secondary pumping system. Fluid in the midsection of the pipeline is removed through perforations 25 in the pipeline wall, located upstream from main line valve 14, by opening valve 22 and engaging pump 23. The fluid then travels through check valve 31 (optional) and piping 26 and is reinjected into the main pipeline at a point upstream from the solid object through injection means 32. Since the fluid is removed from the midsection of the pipeline at a point downstream from the solid object and is reinjected at a point upstream from the solid object, the solid object is urged into the midsection of the pipeline by the ensuing pressure differential. When the solid object is completely contained in the midsection of the pipeline, main line valve 13 and valve 22 are closed and pump 23 is disengaged. Then, main line valve 14 is opened to allow the solid object to move into the downstream section 12 of the main pipeline. In this embodiment, movement of the solid object from the midsection to the downstream section of the pipeline is facilitated by a second secondary pumping system. Valve 27 is opened and pump 28 is engaged to permit a slip stream of fluid to be pumped from jacket 16 through check valve 31 (optional) and piping 29 to midsection 24 at a point just downstream from main line valve 13. This provides for a pressure build-up behind the solid object in the midsection of the pipeline and urges the solid object through main line valve 14 and into the downstream section of the main pipeline. When the solid object is completely contained within the downstream section of the pipeline, main line valve 14 and valve 27 are closed and pump 28 is disengaged. The system is then ready for the arrival of another solid object.

During operation of the pump bypass system, the main fluid flow is maintained from upstream pipeline section 11, through pipe sections 17 and 19 and into downstream pipeline section 12. Since there is no cycling of the main fluid flow stream upon the arrival of a solid object, there are no significant pressure surges in the main pipeline. The only inefficiency in the main pumping station is associated with the small slip streams flowing through pipe sections 26 and 29 during part of the bypass cycle. Therefore, this pump station and pump bypass system have the high efficiency normally associated with pipeline pump stations even when a pipeline capsule, pig or other solid object is being passed by the station.

The timing of operation of main line valves 13 and 14, and of the secondary pumping systems can be critical, especially when the arriving solid object is being used as a spacer to separate batches of fluid in the pipeline. In such a case, it is desirable that the spacer pig re-enter the flowing fluid stream in the downstream section of the pipeline at the interface of the batches to provide for minimal intermixing of the fluids comprising the batches. Proper timing can be provided for by timing control systems known in the art. In FIG. 1, timing of the bypass operation is represented by detection device 21 which senses the arrival of a pipeline pig or other solid object and relays this information to a timing control center. In the appropriate time sequence, the timing control center then controls the operation of main line valve 13 through path 50, the first secondary pumping system through path 51, main line valve 14 through path 52 and the second secondary pumping system through path 53. The detection device can be a photocell, sonic detection device, reed switch or any other means for detecting the presence of a pipeline capsule, pig or other solid object. Alternatively, the timing control center may be eliminated or backed up by placing additional detection devices in the pipeline. For example, detection device 21 may be tied directly to valve 13 to open the valve and engage auxiliary pump system 51. After entering midsection 24 of the pipeline, the solid object is detected by detection device 61 which activates the closing of valve 13, disengagement of auxiliary pump system 51, opening of valve 14 and the engagement of auxiliary pump system 53. After entering the downstream section 12 of the pipeline, the solid object is detected by detection device 30 which activates the closing of valve 14 and disengagement of auxiliary pump system 53. In this manner, the timing control center may be supplemented or backed up by the additional detection devices, or the need for the timing control center may be eliminated entirely. The precise location of detection devices can be varied to provide for maximum efficiency of the bypass system with varying types of solid objects and to insure that solid objects do not get lodged in the closing valves. Valves 13, 14, 22 and 27 can be operated electrically, hydraulically or pneumatically.

Injection means 20 and 32 are represented in FIG. 1 as tangential injection nozzles. Tangential injection nozzles are the preferred means for reinjecting fluid into the main pipeline since the velocity component of the injected fluids is in substantially the same direction as fluid flow in the main pipeline. A more thorough description of these nozzle systems may be found in U.S. Pat. No. 3,325,222 to Round et al. Other injection means may also be used with the present invention.

The secondary pumping systems represented by piping sections 26 and 29 and pumping units 23 and 28 as shown in FIG. 1 are separate systems. Since these systems never operate simultaneously, they may of course, be replaced by a single pumping unit, interconnecting piping and a switching unit to direct fluid flow in an appropriate manner. Such a variation is deemed to be equivalent to the preferred embodiment as shown in FIG. 1 and to be within the scope of the present disclosure.

Piping section 24 can be modified to permit the removal of the solid object and the insertion of a new solid object if desired.

The pump bypass system described is subject to modifications obvious to persons skilled in the art. Such modifications are intended to be within the scope of the specification and appended claims.

What is claimed is:

1. In a pipeline pump station having suction piping and discharge piping connected to the main line of a pipeline at first and second branched openings thereof, and having a pump connecting the first and second branched openings to obtain a by-pass system for automatically passing a solid object through the main line of the pipeline while permitting fluid from the pipeline to flow through the by-pass comprising:

a. a first valve normally closed in the main line downstream from the first branched opening, b. a second valve normally closed in the main line downstream from the first valve but upstream from the second branched opening and spaced at a sufficient distance from the first valve to accommodate the solid object between the first and second valves, c. a midsection of the main line between the first and second valves, d. perforations in the main line upstream of the first valve and downstream of the second valve to permit the fluid within the pipeline to flow from the main line through the first branched opening, then to the pipeline pump, thereafter to the second branched opening and then back into the main line of the pipeline, e. means for detecting when the solid object has passed the perforations in the main line and for opening the first valve, f. means for urging the passage of the solid object through the first valve and into the midsection of the main line once the first valve is opened, g. means for opening the second valve after the solid object has entered the midsection of the main line and the first valve is closed, h. means for urging the solid object to pass through the second valve, and i. means for closing the second valve once the solid object passes through the second valve.

2. The by-pass system of claim 1 wherein the urging means of steps *f* and *h* comprise auxiliary pumping systems which pump the fluid against the solid object to facilitate moving it in the pipeline.

3. The by-pass system of claim 2 wherein the discharge of the pumping system enters the main line of the pipeline via tangential injection nozzles.

4. The by-pass system of claim 1 wherein the solid object is a pipeline pig.

5. The by-pass system of claim 1 wherein the solid object is a pipeline capsule.

* * * * *